(12) United States Patent
Dudley

(10) Patent No.: US 9,494,124 B2
(45) Date of Patent: Nov. 15, 2016

(54) ELECTRICAL APPARATUS

(71) Applicant: SAFRAN Power UK Ltd., Buckinghamshire (GB)

(72) Inventor: Neil Dudley, Chelmsford (GB)

(73) Assignee: SAFRAN POWER UK LTD., Buckinghamshire (GB)

( * ) Notice: Subject to any disclaimer, the term of this patent is extended or adjusted under 35 U.S.C. 154(b) by 0 days.

(21) Appl. No.: 14/420,491

(22) PCT Filed: Aug. 6, 2013

(86) PCT No.: PCT/EP2013/066472
§ 371 (c)(1),
(2) Date: Feb. 9, 2015

(87) PCT Pub. No.: WO2014/023726
PCT Pub. Date: Feb. 13, 2014

(65) Prior Publication Data
US 2015/0198130 A1 Jul. 16, 2015

(30) Foreign Application Priority Data

Aug. 9, 2012 (GB) .................................. 1214246.9

(51) Int. Cl.
| | |
|---|---|
| *F02N 11/00* | (2006.01) |
| *H02P 9/04* | (2006.01) |
| *F02N 11/08* | (2006.01) |
| *F01D 19/00* | (2006.01) |
| *H02P 27/04* | (2016.01) |
| *H02P 1/46* | (2006.01) |
| *H02P 1/52* | (2006.01) |
| *H02P 6/20* | (2016.01) |
| *F02C 7/268* | (2006.01) |

(Continued)

(52) U.S. Cl.
CPC .......... *F02N 11/0866* (2013.01); *F01D 19/00* (2013.01); *F02C 7/268* (2013.01); *H02P 1/46* (2013.01); *H02P 1/52* (2013.01); *H02P 6/20* (2013.01); *H02P 27/04* (2013.01); *F02N 2011/0896* (2013.01); *H02P 9/08* (2013.01); *Y02T 50/671* (2013.01)

(58) Field of Classification Search
USPC ................................... 290/38 R, 46; 307/9.1
See application file for complete search history.

(56) References Cited

U.S. PATENT DOCUMENTS 3,902,073 A * 8/1975 Lafuze .................... F02N 11/04
290/38 R
4,263,643 A * 4/1981 Koike ................. H02M 3/3385
363/19

(Continued)

FOREIGN PATENT DOCUMENTS

| EP | 0 377 328 | 7/1990 |
| EP | 0 605 780 | 7/1994 |

OTHER PUBLICATIONS

International Search Report Issued Feb. 13, 2014 in PCT/EP13/066472 Filed Aug. 6, 2013.

*Primary Examiner* — Pedro J Cuevas
(74) *Attorney, Agent, or Firm* — Oblon, McClelland, Maier & Neustadt, L.L.P.

(57) ABSTRACT

An aircraft electrical apparatus includes an engine starter motor control unit configured to provide an AC input voltage to a transformer rectifier unit. The apparatus includes a transformer rectifier unit for supplying power to an aircraft DC supply bus. The engine starter motor control unit provides the AC input voltage to the transformer rectifier unit.

7 Claims, 3 Drawing Sheets

(51) Int. Cl.
  *H02K 23/52* (2006.01)
  *H02P 9/08* (2006.01)

(56) References Cited

U.S. PATENT DOCUMENTS

| | | | |
|---|---|---|---|
| 4,948,209 A | 8/1990 | Baker et al. | |
| 5,097,195 A * | 3/1992 | Raad | F02N 11/04 290/38 R |
| 5,406,189 A | 4/1995 | Wohlberg et al. | |
| 5,793,185 A * | 8/1998 | Prelec | H01M 2/1072 320/104 |
| 5,899,411 A * | 5/1999 | Latos | B64D 33/00 244/53 A |
| 6,128,204 A | 10/2000 | Munro et al. | |
| 6,950,322 B2 * | 9/2005 | Ferens | H02M 7/08 363/44 |
| 7,045,913 B2 * | 5/2006 | Ebrahim | H02P 9/04 290/52 |
| 7,050,313 B2 * | 5/2006 | Huang | H02M 7/2176 363/128 |
| 7,057,376 B2 * | 6/2006 | Cook | B60R 16/03 323/207 |
| 7,078,825 B2 * | 7/2006 | Ebrahim | H02P 9/04 290/52 |
| 7,400,056 B2 * | 7/2008 | McGinley | F02C 7/268 290/31 |
| 7,612,514 B2 * | 11/2009 | Anghel | H02J 4/00 318/440 |
| 7,728,456 B2 * | 6/2010 | Kusubayashi | B60L 1/00 307/26 |
| 7,800,245 B2 * | 9/2010 | Michalko | H02J 5/00 307/19 |
| 8,427,001 B2 * | 4/2013 | Anghel | B60L 1/00 307/86 |
| 8,928,293 B1 * | 1/2015 | Rozman | H02P 9/14 290/31 |
| 9,231,491 B2 * | 1/2016 | Benson | H02M 7/003 |
| 2004/0008010 A1 * | 1/2004 | Ebrahim | H02P 9/04 322/44 |
| 2004/0080164 A1 | 4/2004 | McKelvey et al. | |
| 2004/0202012 A1 * | 10/2004 | Ferens | H02M 7/08 363/65 |
| 2005/0151517 A1 * | 7/2005 | Cook | B60R 16/03 323/207 |
| 2006/0066113 A1 * | 3/2006 | Ebrahim | H02P 9/04 290/52 |
| 2008/0079262 A1 * | 4/2008 | McGinley | F02C 7/268 290/31 |
| 2008/0111420 A1 * | 5/2008 | Anghel | H02J 4/00 307/9.1 |
| 2009/0015063 A1 * | 1/2009 | Michalko | H02J 5/00 307/19 |
| 2009/0267410 A1 * | 10/2009 | Sardat | H02M 7/08 307/9.1 |
| 2010/0026089 A1 * | 2/2010 | Anghel | B60L 1/00 307/9.1 |
| 2014/0160686 A1 * | 6/2014 | Benson | H05K 7/2089 361/724 |
| 2015/0183385 A1 * | 7/2015 | Iwashima | B60R 16/03 307/9.1 |

* cited by examiner

ELECTRICAL APPARATUS

This invention relates to an electrical apparatus for an aircraft, and in particular to an electronic controller for controlling the electrical supply to an aircraft engine starter motor and to a transformer rectifier unit.

Historically, aircraft engines have been started by the use of pneumatic means. More recently, electrical starting means have been employed to avoid the need for the pneumatic power generator and the associated pipework required where pneumatic starter means are used. The electrical starting means typically comprises an electrically powered starter motor. Advantageously, a brushless starter motor is used which may be directly mechanically coupled to the engine. Brushless motors require an electronic motor control unit to excite the motor windings in response to the motor position and other operational conditions.

Given the relatively high power requirements for starting an aircraft engine, the engine starter motor control units (ESMCUs) used to supply power to and control the operation of the starter motors must be able to handle high currents and voltages, and are consequently relatively large and heavy. Engine starter motor control units are typically not 100% efficient, and a proportion of the power they consume is converted to heat, which needs to be removed. Heat sinks and cooling means further add to the bulk and weight of the ESMCU.

Accordingly, whilst an electrically powered engine start system provides some benefits over pneumatically powered arrangements, such a system comes with the penalty of the aircraft being required to contain a relatively heavy ESMCU which is only used briefly in each flight to start the engines.

It is known for the ESMCU to be used to provide power and control to electric motors used for other engine and aircraft functions during flight. However, as the ESMCU is used to control and supply power to the starter motor at engine start-up, the ESMCU can only be used to supply power to other motors where those motors are not required to be operated during engine start-up. Clearly, this places limitations on the functions in which the ESMCU can be used.

It is an object of the invention to improve the utilisation of the ESMCU. It is a further object of the invention to reduce the weight and bulk penalties of an electric engine start system, and to improve the reliability of aircraft electrical systems.

According to the present invention, there is provided an aircraft electrical apparatus comprising an engine starter motor control unit configured to provide an AC input voltage to a transformer rectifier unit. Preferably, the apparatus comprises a transformer rectifier unit for supplying power to an aircraft DC supply bus, wherein the engine starter motor control unit provides the AC input voltage to the transformer rectifier unit.

Such an apparatus is advantageous in that it may permit the use of a smaller, lighter transformer rectifier unit.

The apparatus may further comprise a battery for supplying power to the DC supply bus when the engine is being started.

Preferably, the apparatus further comprises a DC voltage monitoring means for measuring the output voltage from the transformer rectifier unit. It may further be arranged such that the engine starter motor control unit is configured to adjust the AC input voltage provided to the transformer rectifier unit in response to the output voltage from the transformer rectifier unit measured by the DC voltage monitoring means.

The AC input voltage frequency is preferably selected to be substantially above that of an AC supply bus from which the engine starter motor control unit is supplied, thereby permitting weight savings to be made, but it is preferably lower than the point at which the engine starter motor control unit spends much of its switching cycle transitioning between operating states thereof, when the switching losses become significant and can result in increased heat dissipation. By way of example, the AC input voltage frequency is preferably at least 10 times the frequency of the AC supply bus.

The AC input voltage waveform may take substantially the form of a square wave.

The invention further relates to an aircraft electrical apparatus comprising a transformer rectifier unit for supplying power to an aircraft DC supply bus, wherein the transformer rectifier unit is configured to receive an AC input voltage from an engine starter motor control unit.

The invention will further be described, by way of example, with reference to the accompanying drawings in which.

Figure 1:
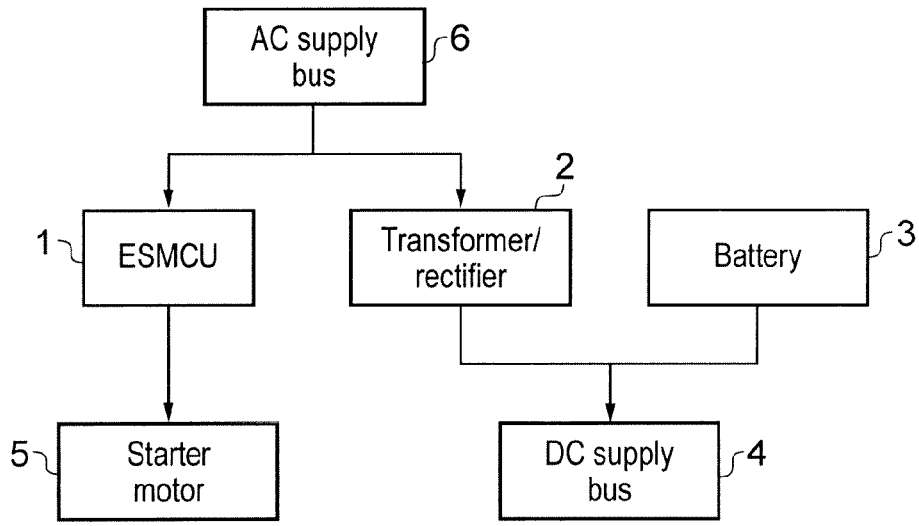
FIG. 1 is a schematic block diagram of a typical aircraft electrical apparatus.

Referring firstly to FIG. 1, a typical aircraft electrical apparatus is shown comprising an engine starter motor control unit (ESMCU) 1 operable to supply power to and control the operation of an engine starter motor 5. The ESMCU 1 is connected to and powered from an AC supply bus 6 which also supplies a transformer/rectifier 2, the output of which is supplied to a DC supply bus 4. A rechargeable battery 3 is arranged to be charged from the output of the transformer/rectifier 2 and to supply power to the DC supply bus 4 in the event that the output of the transformer/rectifier 2 is insufficient to power the various pieces of electrical equipment connected, in use, to the DC supply bus 4.

An aircraft electrical power system typically includes a plurality of electrical supply busses 4, 6, which supply the various electrically powered loads on board the aircraft. In order to provide the required levels of redundancy, a plurality of AC supply busses 6 may be interconnected with one another by suitable switched connections such that in the event of an interruption to the normal supply to one of the AC supply busses 6, appropriate switching of the switched connections can allow that AC supply bus 6 to continue to be powered. Conventionally, the AC supply bus 6 will receive a 3 phase AC supply, operating at approximately 115V and 300 Hz to 80 0Hz, generated by rotary electrical machines driven by the aircrafts engines.

The transformer/rectifier 2 regulates and converts the AC supply to a 28V DC supply.

As with the AC supply bus 6, switched connections may be provided between the DC supply busses 4.

The ESMCU 1 is powered from the AC supply bus 6, and includes a control circuit and power electronics. The ESMCU 1 provides voltages to the motor windings of the starter motor 5 in response to the motor position and the demand for motor power.

The power requirements of the various electrical devices powered from the DC supply bus 4 may be high, and so the transformer/rectifier 2 may be required to provide a large supply output. It is known that transformers tend to provide a lower output voltage when there is an increased level of current draw, for instance as the core of the transformer begins to approach magnetic saturation. This effect is more pronounced with lighter, smaller transformers. Since the transformer/rectifier 2 is required to achieve a specific range of voltages, it must be of a sufficient size and weight to maintain the DC supply within acceptable limits. Furthermore, the frequency of the input to the transformer/rectifier 2 is in the frequency range 300 Hz to 800 Hz, and it is known that transformers operating at such relatively low frequencies tend to be larger than those which operate at higher frequencies. Consequently the transformer/rectifier 2 is typically a relatively heavy item of equipment on the aircraft.

Since the output (or secondary) voltage of the transformer/rectifier is directly related to the input (or primary) voltage, it is also necessary to ensure that the AC supply voltage is well controlled.

Figure 2:
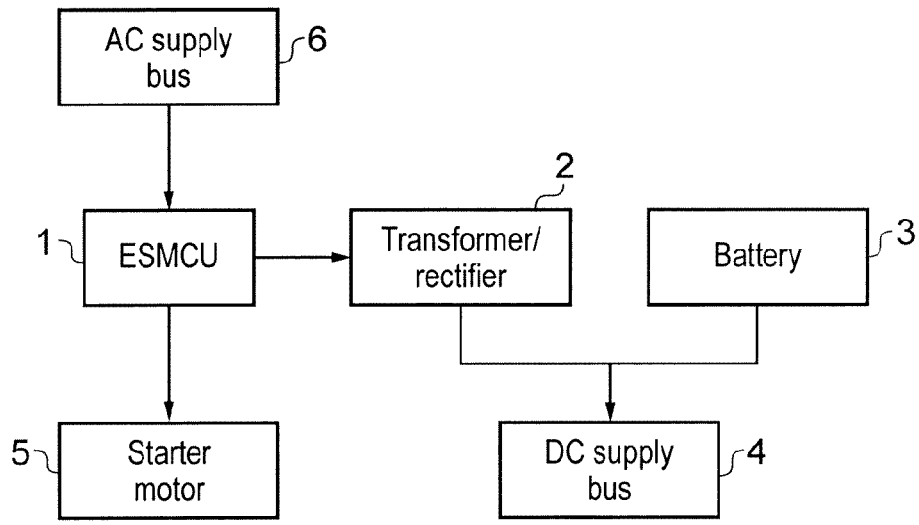
FIG. 2 is a schematic block diagram similar to FIG. 1 but illustrating an electrical apparatus in accordance with an embodiment of the invention.

Referring next to FIG. 2, an aircraft electrical apparatus according to an embodiment of the invention is shown, comprising largely the same elements shown in FIG. 1. However, in contrast to prior art arrangements, in this embodiment the transformer/rectifier 2 is not arranged to be powered directly from the AC supply bus 6 but instead is provided with electrical power by the ESMCU 1. In use, as with the arrangement of FIG. 1, the ESMCU 1 generates the voltages required for the starter motor 5 by switching electronic devices (for example, insulated gate bipolar transistors or field effect transistors) at many tens of kHz. However, in this embodiment, the ESMCU 1 is also configured so that, when it is not supplying voltage to the starter motor 5, it generates a suitable electrical waveform to energise the transformer/rectifier 2, which is correspondingly configured to receive electrical power from the ESMCU 1. This arrangement allows the transformer/rectifier 2 to be greatly reduced in size and weight, since the waveform from the ESMCU 1 can be provided at a different, higher frequency than is available from the AC supply bus 6. The skilled person will appreciate that the core size of a transformer decreases with increasing frequency. The applicant has found that the reduction in weight of the transformer/rectifier 2 that can be achieved with this approach is a significant fraction of the weight of the ESMCU 1. This reduces the total weight of the electronic equipment required to provide the electric engine start system, and allows the aircraft to carry more payload than an aircraft with a prior art electric engine start arrangement.

During the time that the ESMCU 1 is required to start the engine, typically around one minute, the ESMCU 1 will be unable to provide power to the transformer/rectifier 2.

During this period the electrical loads on the DC supply bus may be supplied by the battery 3. This arrangement is advantageous since it results, during engine start with the aircraft on the ground, in the battery 3 being subjected to the full electrical load it would be required to supply, should the supply from the AC supply bus 6 fail during flight. Since the performance of rechargeable batteries typically declines with age it is important that they are periodically checked to determine that they can supply the required load. Testing immediately prior to flight is ideal, as it ensures that the battery performance is not degraded. Thus, during the engine start procedure where the output of the ESMCU 1 is being used to drive the starter motor 5, by checking that the various devices powered by the DC supply bus 4 are operating correctly, it can be determined that the battery 3 is capable of meeting the required load. The use of the ESMCU 1 both to supply power to the starter motor 5 and, at times other than engine start, to drive the transformer/rectifier 2 thus has the additional advantage of permitting testing of the ability of the rechargeable battery 3 to meet the required load.

The power required from the EMSCU 1 to drive the transformer/rectifier 2 is significantly less than the power required to drive the starter motor 5. As the EMSCU 1 has to be designed for the higher power level required during engine start, it will operate for the majority of its life at a relatively low power level, supplying the transformer/rectifier 2. This naturally leads to an EMSCU 1 with enhanced reliability and a long service lifetime.

In an alternative embodiment, the apparatus may be arranged so that the ESMCU output is connected to the transformer/rectifier 2 at all times, although reduced power may be available from the DC supply bus 4 during periods when the ESMCU 1 is actually starting the engine. During these periods the ESMCU output will be optimised for driving the starter motor 5, and may be sub-optimal for driving the transformer/rectifier 2.

Another advantage of the embodiment of FIG. 2 is that the ESMCU 1 may include additional features (not shown) to control the electrical waveform provided to the transformer/rectifier 2. For example, the DC voltage output from the transformer/rectifier 2 may be monitored, and the electrical waveform from the ESMCU 1 adjusted accordingly to compensate for any variations in output voltage from the transformer/rectifier 2. For example, the ESMCU 1 may compensate for the tendency of the transformer/rectifier 2 to provide a lower voltage under high current output, thereby allowing further reductions in the size of the transformer/rectifier 2. Furthermore, the ESMCU 1 may include features that compensate for variations in the voltage amplitude of the AC supply bus 6.

A further advantage of providing the transformer/rectifier 2 with power from the ESMCU 1, and being able to increase the frequency of this power supply, is that the high frequency of operation will result in a higher frequency ripple in the output of the transformer/rectifier 2, which is more easily filtered with small and light weight components. The resultant voltage ripple on the DC supply bus 4 may therefore be reduced.

Figure 3:
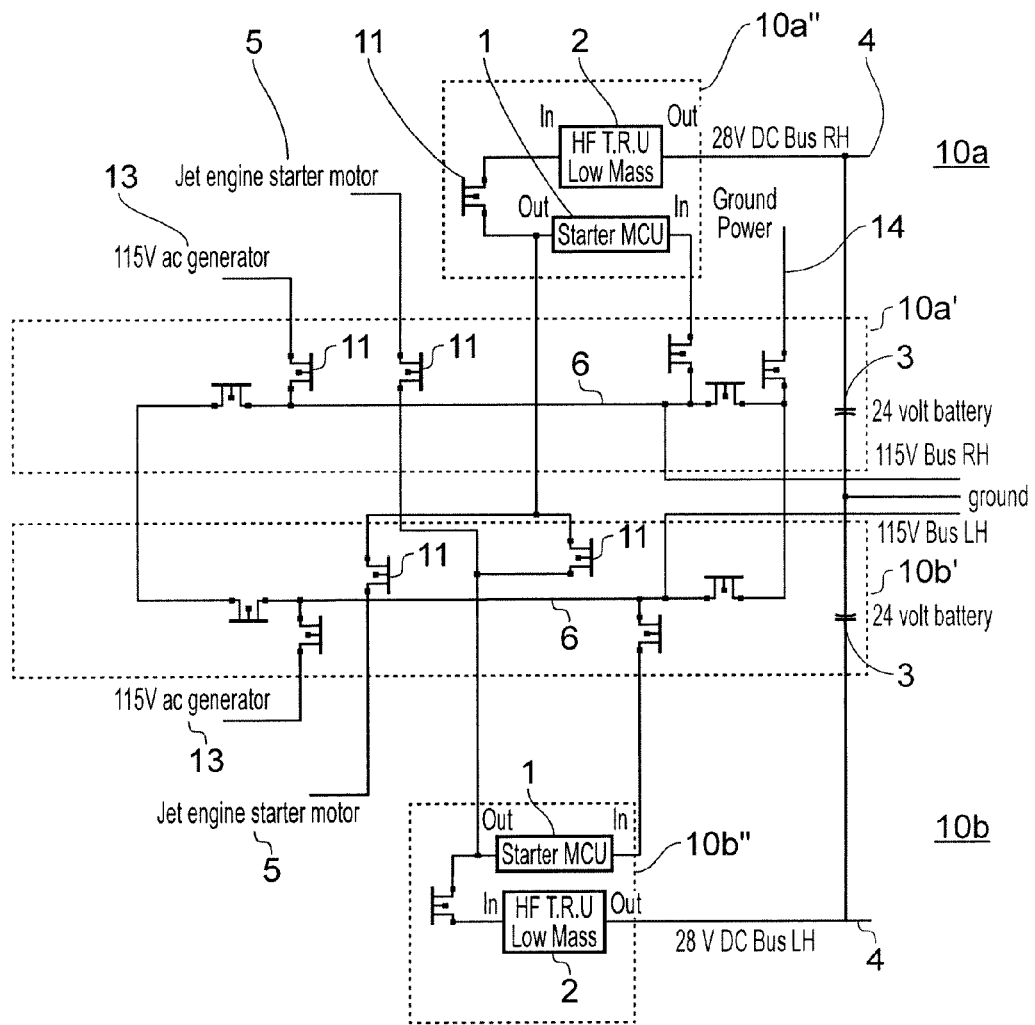
FIG. 3 is a circuit diagram of an aircraft power supply system incorporating an electrical apparatus in accordance with an embodiment of the invention.

FIG. 3 is a circuit diagram of an apparatus which operates in the manner described hereinbefore with reference to the block diagram of FIG. 2. In FIGS. 2 and 3, like reference numerals are used to denote like parts.

The apparatus of FIG. 3 is of substantially symmetrical form with an upper section 10*a* and a lower section 10*b* which are substantially equivalent to one another and which are used, for example, with respective engines of a twin engined aircraft. Whilst FIG. 3 illustrates a circuit with two substantially equivalent parts, it will be appreciated that the invention is not restricted in this regard. The upper section 10*a* comprises an ESMCU 1, a transformer/rectifier 2, a battery 3, a 28Vdc supply bus 4, an engine starter motor 5, and a 115Vac generator 13 driven by the engine. Although the generator 13 and motor 5 are shown separately, it is practical and well known to combine these functions into a single rotary machine. The generator 13 supplies an output to an AC supply bus 6. The ESMCU 1 provides both the starter motor 5 and transformer/rectifier 2 with power. The lower section 10*b* comprises the same set of components and functionality as the upper section 10*a*. Electronic switches 11 are provided between the various elements of the circuit to control the operation of the electric engine start system and the integration with the aircraft power supply system.

Both engines can either be started from ground power via connection 14 or from 115Vac electrical power provided by either generator 13. This arrangement also permits both DC supply busses 4 to be powered from either AC supply bus 6, or from AC power derived from ground power, via either of the ESMCUs 1 and associated transformer/rectifier 2.

Whilst the apparatus shown in FIG. 3 could be formed as a single unit, it is thought that it would be convenient for each of the sections 10a, 10b to take the form of two separate units. Thus, the upper section 10a may comprise a first unit 10a' including the AC supply bus 6 and a number of switches 11, and a second unit 10a" including the ESMCU 1 and the transformer/rectifier 2. Similarly, the lower section 10b may comprise two separate units 10b', 10b".

Figure 4:
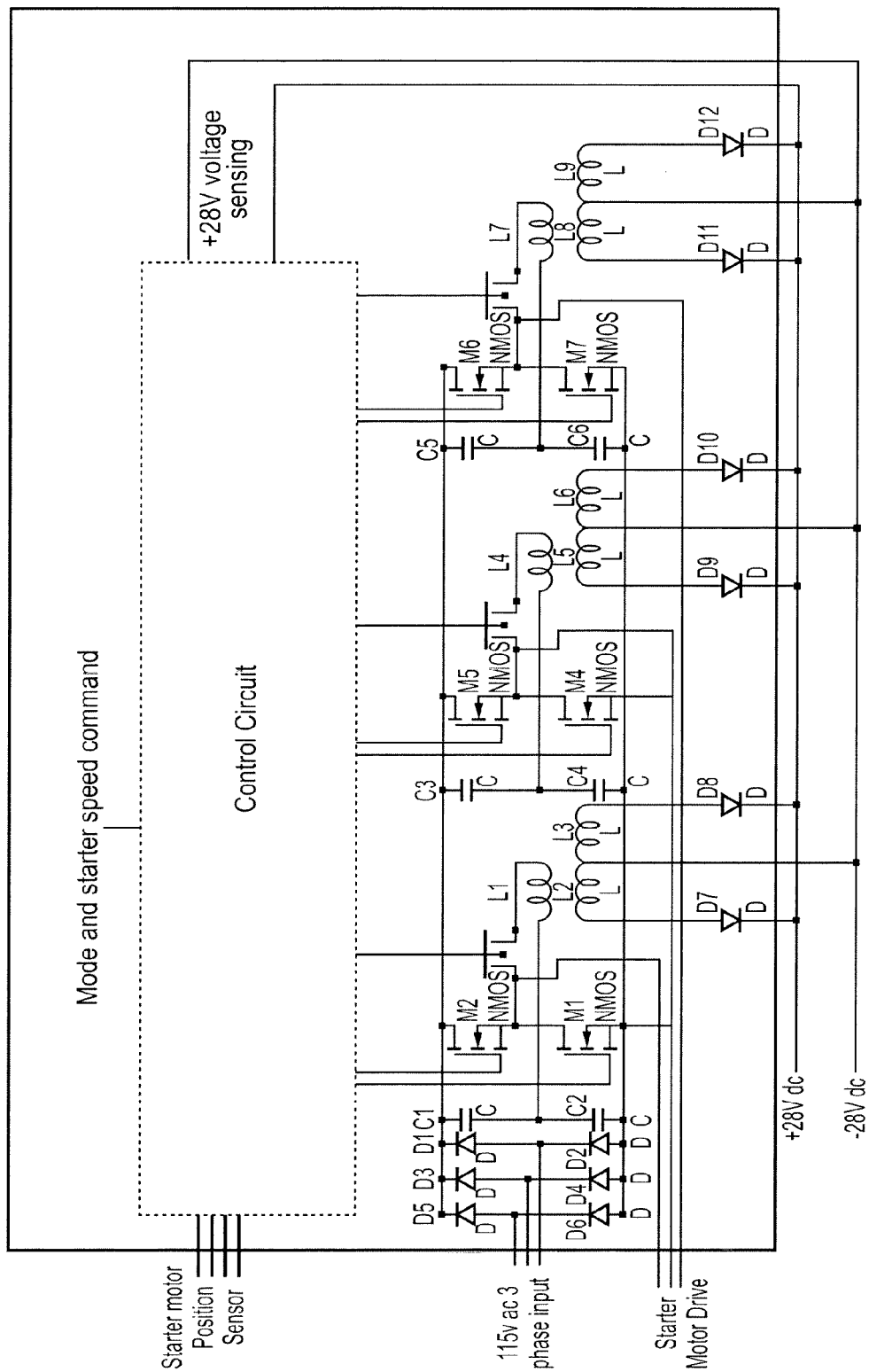
FIG. 4 is another circuit diagram illustrating part of the apparatus of FIG. 3.

FIG. 4 is a schematic circuit diagram of the ESMCU 1 and transformer/rectifier 2 of the unit 10a" of FIG. 3. The ESMCU 1 comprises a 3-phase full wave bridge rectifier 24, and three full bridge NMOSFET motor drive circuits 26, 27, 28. Transformer rectifier circuits 29, 30, 31 are respectively associated with each motor drive circuit 26, 27, 28. The gates of each NMOSFET of each motor drive circuit 26, 27, 28 are connected to a control circuit 21, and the output of each motor drive circuit is connected to a winding of the starter motor 5 and, via an electronic switch 32, 33, 34, to the primary winding of the respective transformer of the associated transformer/rectifier circuits 29, 30, 31. The control circuit 21 can thereby control the voltages applied to both the starter motor windings and to the transformer rectifier circuits 29, 30 31.

As illustrated, each motor drive circuit 26, 27, 28 takes the form of an upper NMOSFET 26', 27', 28' controlled by the ESMCU 1 and operable to control the connection between a high output line 24a from the rectifier 24 and the starter motor drive connections/primary windings of the transformers of the transformer/rectifier circuits 29, 30, 31, and a lower NMOSFET 26", 27", 28", also controlled by the ESMCU 1, operable to control the connection between a low output line 24b from the rectifier 24 and the starter motor drive connections/primary windings of the transformers of the transformer/rectifier circuits 29, 30, 31. In use, by controlling the states of the upper and lower NMOSFETs, a substantially square input waveform can be supplied to the primary windings of the transformer/rectifier circuits 29, 30, 31. In use, the NMOSFETs of each drive circuit are controlled in such a manner that three operating states are possible: upper NMOSFET on (or high) and lower NMOSFET off (or low); upper NMOSFET off and lower NMOSFET on; and both NMOSFETs off. As a consequence, it can be ensured that there is no DC component supplied to the associated primary winding. By controlling the proportion of the time during which both NMOSFETs are off, the net output voltage from the associated transformer/rectifier circuit can be controlled.

The output of the secondary windings of each transformer of the transformer/rectifier circuits 29, 30, 31 is centre tapped, and also full wave rectified by diodes at either end of the respective secondary winding. The voltages from the centre taps thereby form the negative DC supply bus voltage, and the voltages from the diodes at either end of the secondary windings form the positive DC supply bus voltage. Each of the three transformer rectifier circuits 29, 30, 31 is connected in parallel to the positive and negative DC supply bus rails. A pair of smoothing capacitors is provided on the input to the primary windings of each transformer rectifier circuit. These capacitors perform the dual functions of providing a measure of smoothing on the DC supply bars, whilst also preventing DC from flowing in the transformer primary windings, for example in the event of an equipment fault, or if the upper and lower switches in the motor drive circuits 26, 27, 28 should become unsynchronised for any reason.

The control circuit 21 receives a mode and starter speed command, and controls the operation of the ESMCU 1 and transformer/rectifier 2 by switching the NMOSFETs of the motor drive circuits 26, 27, 28 and the electronic switches 32, 33, 34. It will be appreciated that, if desired, the switches 32, 33, 34 could take the form of mechanical type switches. A starter motor position sensor 23 provides the control circuit 21 with the motor position, and the control circuit 21 monitors the voltage provided on the DC supply bus 4 via DC voltage sensing wires 22. The control circuit may thereby provide the advantageous functions described hereinbefore. Specifically, at engine start, the control circuit 21 can be operated to open the switches 32, 33, 34 such that the output of the ESMCU 1 is supplied to the starter motor 5, and at other times the switches 32, 33, 34 can be closed so that the output of the ESMCU 1 is used to drive the transformer rectifier circuits 29, 30, 31 to provide the required output to the DC supply bus 4. Some of the switches 11 (see FIG. 3, not shown in FIGS. 4) serve to prevent power flowing from the ESMCU 1 to the starter motor 5 when the system is driving the transformer/rectifier 2 only.

Although conventional diodes have been described as rectifying the output from the transformers, other arrangements are possible. Active rectification may be used, for example with field effect transistors operating as synchronous switches. Such an approach may give rise to lower losses and higher efficiency, without changing the essential operating principle.

The present invention results in a significant reduction in the size and weight penalties associated with an aircraft electric start system, and furthermore enables a number of enhancements in the performance and reliability of the transformer/rectifier supplying the DC bus.

A further benefit of the described arrangement is that it is capable of regulating the 28Vdc supply bus. With a conventional transformer/rectifier, there will be some variation of the voltage at the output of the transformer/rectifier due to variations in the AC input thereto and the amount of load on the transformer. In order to guarantee that the voltage at the utilisation equipment terminals is within acceptable limits the electrical system designer has to ensure that the voltage drop along the cables carrying the DC bus is sufficiently low allowing for variation at the transformer/rectifier terminals. With a regulated transformer/rectifier output, a greater voltage variation due to voltage drop along the cables would be permissible, whilst still maintaining the correct supply voltage to the utilisation equipment. This would enable the cable for the DC bus and associated terminals to be of small cross-section, and hence lighter, offering a further weight saving on the aircraft, without any changes to the utilisation equipment.

It will be appreciated that a wide range of modifications and alterations may be made to the arrangements described hereinbefore without departing from the scope of the invention, as defined in the appended claims.

The invention claimed is:

1. An aircraft electrical apparatus comprising:
a transformer rectifier unit configured to supply power to an aircraft DC supply bus;
an engine starter motor controller configured to provide an AC input voltage to the transformer rectifier unit, wherein the AC input voltage frequency is selected to be above that of an AC supply bus from which the engine starter motor controller is supplied; and
a battery configured to supply power to the DC supply bus when the engine is being started.

2. The aircraft electrical apparatus according to claim 1, further comprising a DC voltage monitor configured to measure the output voltage from the transformer rectifier unit.

3. The aircraft electrical apparatus according to claim 2, wherein the engine starter motor controller is configured to adjust the AC input voltage provided to the transformer rectifier unit in response to the output voltage from the transformer rectifier unit measured by the DC voltage monitor.

4. The aircraft electrical apparatus according to claim 1, wherein the AC input voltage is substantially a square wave.

5. The aircraft electrical apparatus according to claim 1, wherein the transformer rectifier unit is configured to receive the AC input voltage from the engine starter motor controller.

6. An aircraft electrical apparatus comprising:
an engine starter motor controller configured to provide an AC input voltage to a transformer rectifier unit, wherein
the AC input voltage frequency is selected to be above that of an AC supply bus from which the engine starter motor controller is supplied, and
the AC input voltage frequency is at least 10 times a frequency of the AC supply bus.

7. An aircraft electrical apparatus comprising:
an engine starter motor controller configured to provide an AC input voltage to a transformer rectifier unit, wherein
the AC input voltage frequency is selected to be above that of an AC supply bus from which the engine starter motor controller is supplied, and
the AC input voltage frequency is lower than a point at which the engine starter motor controller spends much of its switching cycle transitioning between operating states thereof.

* * * * *